United States Patent
Le Perchec et al.

(10) Patent No.: US 6,646,103 B1
(45) Date of Patent: Nov. 11, 2003

(54) METHOD FOR OBTAINING OXACARBONYL POLYMERS, FUNCTIONALIZATION, RESULTING POLYMERS AND FUNCTIONALIZING AGENT

(75) Inventors: Pierre Le Perchec, Lyons (FR); Roselyne Baudry, Villeurbanne (FR); Frédéric Alvarez, Lyons (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 09/959,638

(22) PCT Filed: May 5, 2000

(86) PCT No.: PCT/FR00/01235

§ 371 (c)(1),
(2), (4) Date: Dec. 10, 2001

(87) PCT Pub. No.: WO00/68293

PCT Pub. Date: Nov. 16, 2000

(30) Foreign Application Priority Data

May 7, 1999 (FR) .............................. 99 06039
Mar. 6, 2000 (FR) .............................. 00 02864

(51) Int. Cl.$^7$ ........................ C08G 63/00; C08G 63/08; C08G 63/82
(52) U.S. Cl. ........................ 528/354; 528/355; 528/357; 528/361; 528/363; 525/415; 525/418
(58) Field of Search ................................ 528/354, 355, 528/357, 361, 363; 525/418, 415

(56) References Cited

U.S. PATENT DOCUMENTS 6,291,597 B1 * 9/2001 Gruber et al. .............. 528/354

FOREIGN PATENT DOCUMENTS

| EP | 0 104 875 A1 | 4/1984 |
| EP | 0 150 962 A2 | 8/1985 |
| GB | 1 016 394 A | 1/1966 |

* cited by examiner

*Primary Examiner*—P. Hampton-Hightower
(74) *Attorney, Agent, or Firm*—Oliff & Berridge, PLC

(57) ABSTRACT

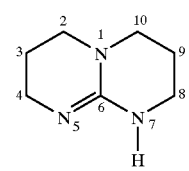

(I)

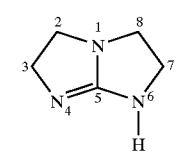

(II)

The invention concerns a method for obtaining oxacarbonyl polymers comprising steps which consist in: providing at least monomers comprising at least a cyclic oxacarbonyl function, an initiator, and in polymerising or copolymerising said monomers, in bulk or in solution, the initiator being selected among bicyclic guanidine compounds of formula (I) or (II) wherein one and/or the other of the cycles can be substituted, in at least any one of positions 2, 3, 4, 8, 9 and 10 of formula (I) or in at least any one of positions 2, 3, 7 and 8 of formula (II), by at least a radical selected among the alkyl groups with 1 to 6 carbon atoms, the cycloalkyl groups with 5 to 7 carbon atoms, polystyrene hydrocarbon chains.

23 Claims, 5 Drawing Sheets

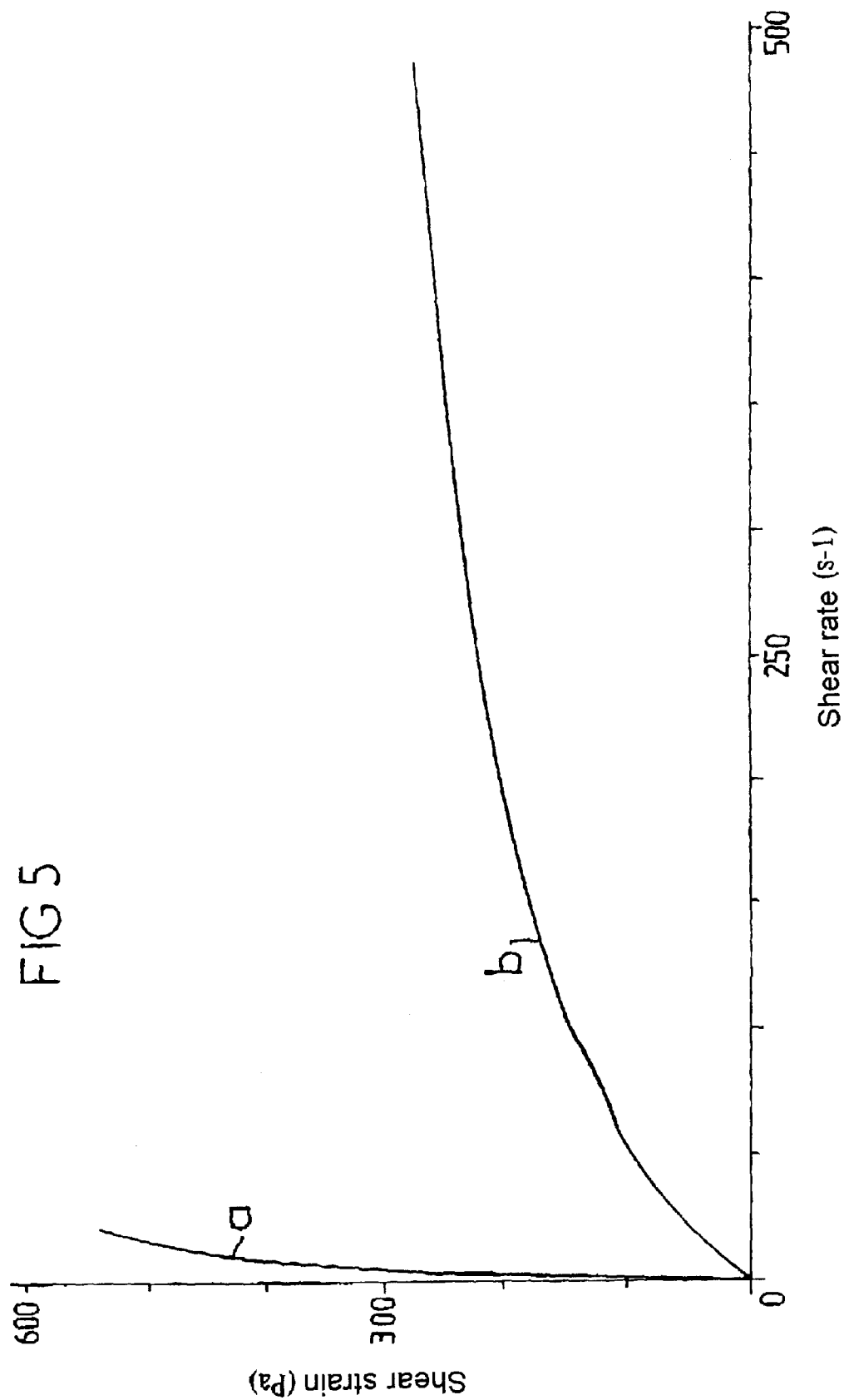

METHOD FOR OBTAINING OXACARBONYL POLYMERS, FUNCTIONALIZATION, RESULTING POLYMERS AND FUNCTIONALIZING AGENT

The invention relates to a process for producing oxacarbonylated polymers by opening rings and polymerization of monomers comprising at least one cyclic oxacarbonyl function, such as a lactone function.

Lactones have a known capacity to polymerize, under reaction conditions and according to mechanisms which vary essentially depending on the starting lactone monomer and on the catalyst or initiator used. In order to initiate polymerization by opening rings, the prior art teaches a diversity of initiators; thus, the latter may be anionic in nature, such as a hydride, a carbanion, an alkoxide, a thiolate or an alkali metal, alkaline earth metal, aluminum, zinc or tin carboxylate; it may be nucleophilic and uncharged in nature, such as a tertiary amine for polymerization of β-propiolactone, or a phosphine; it may also be chosen from protic compounds such as carboxylic acids, alcohols, glycols, or polar functions such as primary and secondary amines and combinations of structures such as alkanolamines, or from coordination complexes, such as those of aluminum.

In general, the polymerization reaction is carried out in totally anhydrous medium, in an inert solvent, at a temperature which must sometimes exceed 150° C.

Polymerization conditions known to date produce, however, great variability of polymerization yields and of the polymolecularity and polydispersity indices for the polymer obtained, depending on the starting monomer. In addition, the known initiators are often undesirable and/or toxic.

The present invention provides a process for producing oxacarbonylated polymers from monomers comprising at least one cyclic oxacarbonyl function, and in particular a lactone function, making it possible, under gentle reaction conditions, to obtain complete consumption of the starting monomer(s).

Specifically, according to the process of the invention, firstly, a temperature close to room temperature is often sufficient to polymerize certain lactones, for which the reaction requires high temperatures using known polymerization processes, and, secondly, polymers which, after washing, are free of starting monomers and of initiator are produced, which makes them very easy to isolate and makes it possible to envision using them in very varied applications, including those in which it is essential to have a pure polymer.

The process of the invention comprises the following steps:

At least a monomer comprising at least one cyclic oxacarbonyl function, and an initiator, are available, The polymerization or copolymerization of said monomer is carried out in bulk or in solution, The initiator being chosen from the bicyclic guanidine compounds corresponding to formula (I) or formula (II)

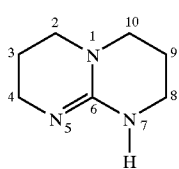
(I)

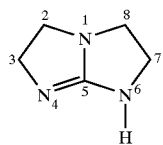
(II)

in which one and/or the other of the rings may be substituted, in at least any one of positions 2, 3, 4, 8, 9 and 10 of formula (I) or in at least any one of positions 2, 3, 7 and 8 of formula (II), with at least one radical chosen from alkyl groups having from 1 to 6 carbon atoms, cycloalkyl groups having from 5 to 7 carbon atoms and the hydrocarbon-based chains of polystyrene.

An oxacarbonyl function is intended to mean a function —O—CO— included in a ring, the monomer therefore comprising at least one oxygenated heterocycle. By way of example, it may be a lactone function.

A preferred initiator corresponds to formula (I) and is 7H-1,5,7-triazabicyclo[4.4.0]dec-5-ene (hereinafter denoted TBD).

As mentioned above, the monomer(s) may comprise at least one lactone function; they are then advantageously chosen from the group consisting of ε-caprolactone, δ-valerolactone, β-butyrolactone, γ-butyrolactone, 2,6-dimethyl-1,4-dioxan-2,5-dione (or lactide) and 1,4-dioxan-2,5-dione (or glycolide).

Depending on the choice of starting monomer(s), the process leads to the production of a homopolymer if only one monomer is available, or of a copolymer, the latter possibly being a block copolymer or a random copolymer, if at least two different monomers are reacted.

The preferential reaction conditions of the process according to the invention are stated hereinafter, and they should be considered alone or in combination:

the molar ratio of the monomer(s) to the initiator ranges from 1 to 500, advantageously from 1 to 200, the reaction is carried out at a temperature ranging from 0° C. to 150° C., preferably from 50° C. to 120° C., the reaction is carried out in bulk; it may also be carried out in a solvent, in particular chosen from tetrahydrofuran (THF), toluene, acetone and dibutyl ether, the reaction duration ranges from 10 minutes to 12 hours.

A subject of the present invention is an oxacarbonylated polymer which can be produced using the production process defined above.

The process of the invention also has the advantage of making it possible to functionalize the polymers obtained in situ, directly in the reaction mixture, so as to produce activated or activatable polymers modified by functionalization. This functionalization is carried out using a functionalizing agent and, depending on the intended purpose of the polymer, this functionalization may be particularly advantageous. By way of illustration, after functionalization, biodegradable modified polylactones are produced, having the properties of an agent which modifies the viscosity of organic solvents and aqueous media, including water.

A functionalizing agent according to the invention is preferably a linear or branched molecule or macromolecule comprising at least one alcohol or amine function.

This agent may be selected from:

pure functionalizing compounds, such as butanol, ethoxyethanol, pentaerythritol, allylamine, methoxyethylamine, decylamine, ethoxyethanolamine and esters of carboxylic acids, functionalized polymers, for instance polymers and copolymers, such as polymers and copolymers of alkylene glycol, and especially polymers and copolymers of ethylene glycol, in particular copolymers of ethylene glycol (PEG) and of propylene glycol (PPG), mixtures of said polymers, mixtures of said copolymers, mixtures of said polymers and copolymers, polyalkyleneamines such as Jeffamines®, polyesters such as polyethylene terephthalates, and mixtures thereof, with natural products such as polyglucosides and, by way of example, gums, dextrans, chitosans and starch, and from mixtures of these agents, and mixtures of the abovementioned agents: by way of example, the mixture comprising at least one ethylene glycol polymer and at least one polyglucoside may be chosen.

Gums, such as xanthan gum and guar gum, optionally mixed with another functionalizing agent, such as an alkylene glycol polymer, constitute particularly advantageous agents.

The polymerization and the functionalization may be carried out sequentially or they may be carried out in situ simultaneously, in bulk or in the solvent.

Thus, the invention relates to a process for producing oxacarbonylated polymers, as defined above, according to which a functionalizing agent is added to the monomer and to the initiator, according to an in situ method or a sequenced method. A preferred agent is chosen from the agents listed above.

A subject of the invention is also an agent for functionalizing an oxacarbonylated polymer, which comprises at least one gum, such as a xantham or guar gum, combined with at least one polymer and/or one copolymer of alkylene glycol oxide, such as the polymers and copolymers of ethylene glycol oxide (PEG).

The invention also relates to a functionalized oxacarbonylated polymer which can be produced using the polymerization and functionalization process defined above.

Another subject of the invention is the use of a bicyclic guanidine compound corresponding to formula (I) or (II) mentioned and described above, for initiating the reaction of polymerization or of copolymerization with the action of monomers comprising at least one cyclic oxacarbonylated function. Advantageously, the bicyclic guanidine compound is TBD.

According to a variant of use of the initiator of the invention, the latter is attached directly or indirectly, or deposited, onto a solid support. By way of example, a suitable support is mineral or organic and consists of a resin, a polymer such as a polystyrene or a polypropylene, a copolymer such as a polystyrene/divinylbenzene copolymer, silica, clay, diatomite, zeolite, alumina or aluminosilicate. The expression "directly or indirectly" is intended to mean that said agent comprises, at least on one of its rings, a radical capable of binding to said support, or a radical which will be bound to said support via a coupling arm. The latter is generally a hydrocarbon-based chain. The term "deposited" is intended to mean that said initiator is adsorbed onto an organic or mineral support.

The present invention is illustrated hereinafter by Examples, 1 to 12, with the support of the diagram comprising FIGS. 1 to 5.

(a) solution at an aquaeous concentration of 6%

(b) solution at an aquaeous concentration of 4%.

Figure 4:
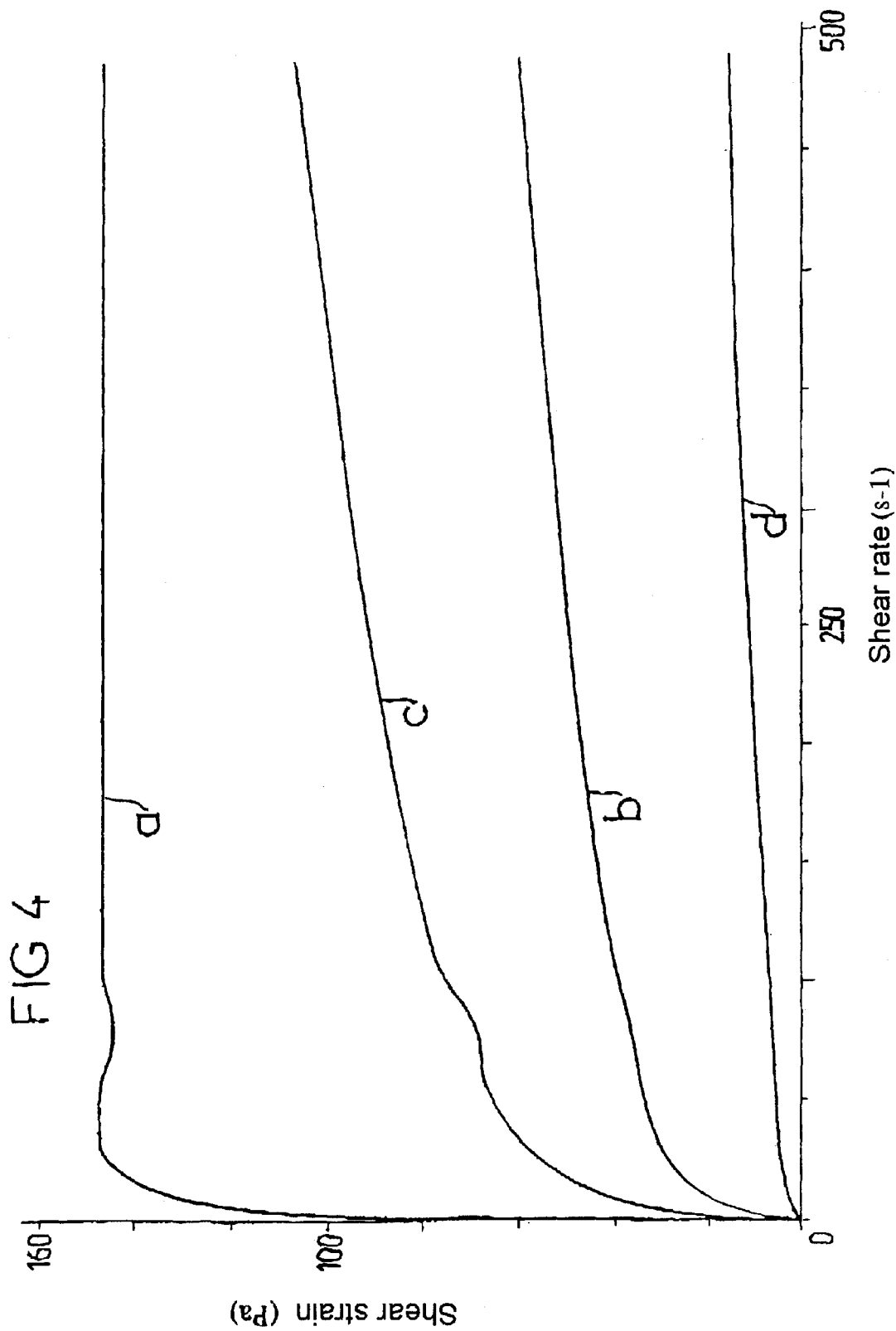

FIG. 4 illustrates the rheofluidizing properties of the guar gum before (initial or unmodified guar) and after functionalization (modified guar) of the $\epsilon$-polycaprolactone according to Example 9.5, by representing the shear strain (in Pa) as a function of the shear rate (second$^{-1}$):

(a) unmodified guar at an aqueous concentration of 1% by weight (b) unmodified guar at an aqueous concentration of 0.5%

(c) modified guar at an aqueous concentration of 2.5%

(d) modified guar at an aqueous concentration of 1%.

EXAMPLE 1

Preparation of Polyesters According to the Invention Using Various Lactones

The polyesters produced correspond to the following formula:

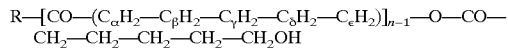

$$R\text{—}[CO\text{—}(C_\alpha H_2\text{—}C_\beta H_2\text{—}C_\gamma H_2\text{—}C_\delta H_2\text{—}C_\epsilon H_2)]_{n-1}\text{—}O\text{—}CO\text{—}$$
$$CH_2\text{—}CH_2\text{—}CH_2\text{—}CH_2\text{—}CH_2OH$$

in which n represents the polymolecularity index and R represents a group chosen from the guanidine group (TBD); OR' in which R' represents H or an alkyl group determined according to the alcohol selected at the end of the reaction; an acid function COOH; an ester function CHCOOR"; an amide function CHCONHR" in which R" is an alkyl group respectively determined according to the alcohol or the amine used at the end of the reaction.

1.1—Preparation of the homopolymer 3600-polycaprolactone 57 g (0.5 mol) of $\epsilon$-caprolactone are introduced into a 100 ml three-necked reactor under nitrogen and 13.9 g of solid TBD (0.1 mol) are added, the monomer/initiator (M/I) molar ratio being equal to 5. The initiator completely dissolves with stirring and the reaction is exothermic. The temperature reaches 75° C. The mixture is stirred at 500 rpm for 20 minutes. The viscose mixture is then brought to 80° C. for three hours, then to 100° C. for one hour and finally to 120° C. for one and a half hours.

The crude product is characterized by spectral analyses and steric exclusion chromatography (SEC) with THF.

Specifically, the NMR analysis indicates the unresolved peaks characteristic of polycaprolactones at $\delta$ in ppm of 1.4 $CH_2$ $\gamma$; 1.65 $CH_2$ ($\delta$, $\beta$) ; 2.31 $CH_2$ $\alpha$ (triplet); 4.06 $CH_2$ $\epsilon$ (triplet). The $CH_2OH$ chain end appears at $\epsilon_T$=3.62 ppm (triplet). The NMR spectrum gives a polymolecularity index of 30.

The molecular mass measured by SEC (solvent THF, polystyrene internal reference) is Mn=3675 and Mw=12050; the Mn/Mw ratio=3.28.

The presence of the initiator is completely detectable by NMR, at $\delta$=2.22 and 3.34 ppm (in the form of unresolved peaks).

The polymer may be obtained free of traces of initiator if necessary, by dissolving the polymer in a solvent, such as methylene chloride or toluene, followed by extraction with acidified water. 200 ml of $CH_2Cl_2$ and 200 ml of an aqueous solution of acetic acid diluted at 2% are added to the viscose mixture. The mixture is allowed to settle and the organic phase is isolated. This is washed with 100 ml of water containing 2% of HCl and then again with pure water, and the organic phase is dried.

55 g of pure polycaprolactone identical to an authentic sample are isolated. No trace of monomer is detectable by NMR or by SEC.

1.2—Preparation of the homopolymer 5500-polycaprolactone

The procedure described above in 1.1 is repeated for an M/I molar ratio of 10, with 57 g (0.5 mol) of ε-caprolactone and 6.95 g (0.05 mol) of TBD.

The reaction is exothermic and the mixture becomes viscose after stirring for fifteen minutes.

The same protocol for synthesis as that described in 1.1 produces the crude polycaprolactone and then the polycaprolactone purified by washing.

The mean molecular masses obtained by SEC (THF) are: Mn=5500 and Mw=20900, Mn/Mw=3.80.

1.3—Preparation of the homopolymer 30000-polycaprolactone

The procedure described above in 1.1 is repeated for an M/I molar ratio of 40, with 57 g (0.5 mol) of ε-caprolactone and 1.73 g (0.0125 mol) of TBD.

The reaction is exothermic and the mixture becomes viscose after stirring for fifteen minutes.

The same protocol for synthesis as that described in 1.1 produces the crude polycaprolactone and then the polycaprolactone purified by washing.

The proton NMR analysis indicates a polymolecularity index of 230. The mean molecular masses obtained by SEC (THF) are: Mn=34000 and Mw=49400, Mn/Mw=1.32.

1.4—Preparation of the homopolymer 30000-polycaprolactone

The procedure described above in 1.1 is repeated for an M/I molar ratio of 185, with 57 g (0.5 mol) of ε-caprolactone and 0.38 g (0.0027 mol) of TBD.

The proton NMR analysis indicates a polymolecularity index of 230. The mean molecular masses obtained by GPC (THF) are: Mn=30700 and Mw=62000, Mn/Mw=2.02.

1.5—Preparation of the homopolymer 15000-polycaprolactone

The polymerization of ε-caprolactone is carried out for an M/I molar ratio of 100, in the disk-shaped gaps of a rheometrix at the temperature of 80° C.

Figure 1:
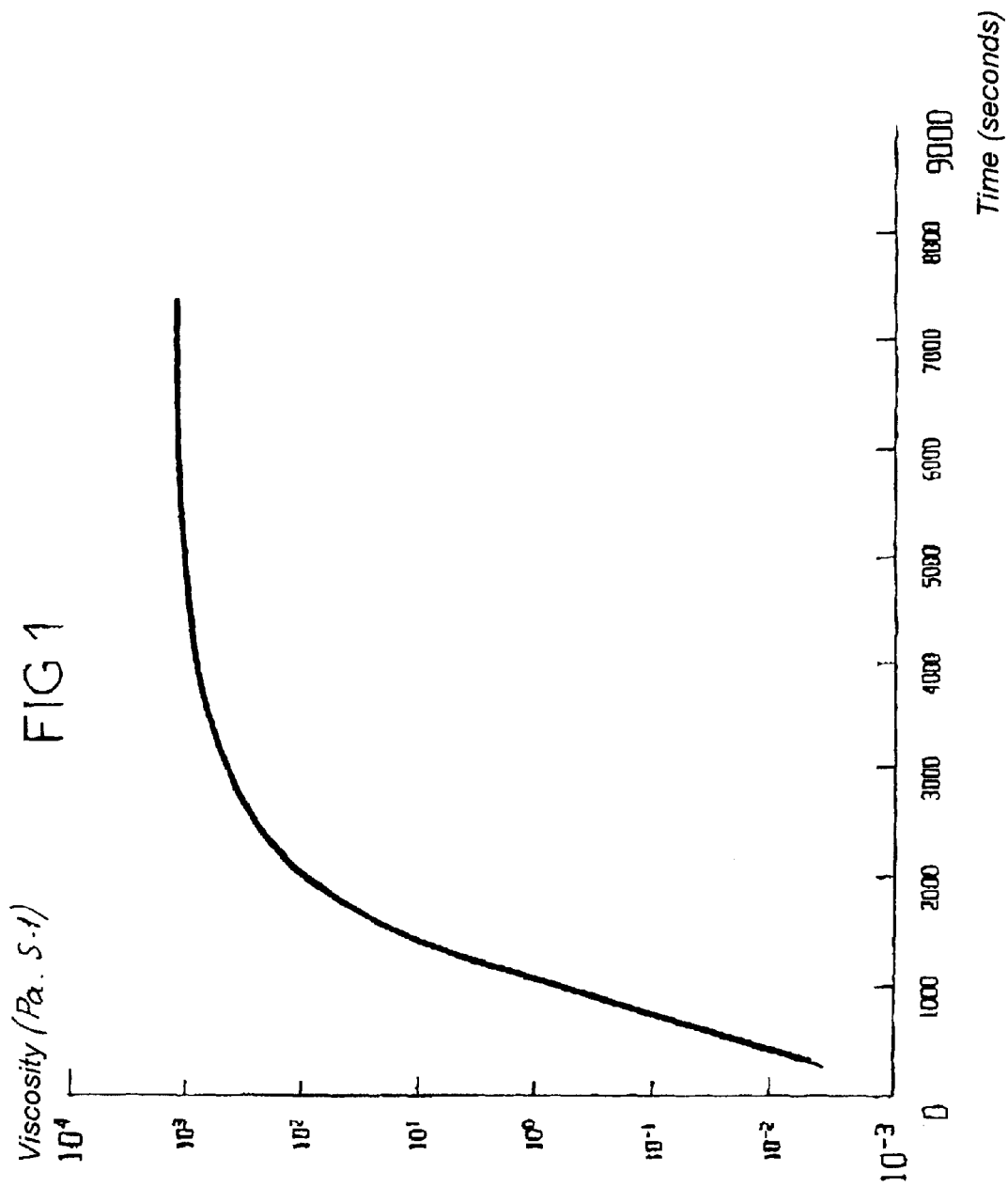
FIG. 1 represents the viscosity (in Pa.s$^{-1}$ of the reaction medium described in Example 1.5 as a function of time (in second)

The increase in viscosity is visualized on FIG. 1. The viscose plateau is reached after 4500 seconds of contact. The viscosity value is then 1100

The $^1$H NMR analysis of the sample gives a polymolecularity index of 98. The mean molecular masses obtained by SEC (THF) are Mn=15000 and Mw=29000, Mn/Mw=1.95.

1.6—Preparation of the homopolymer 26000-polycaprolactone

The polymerization of ε-caprolactone is carried out for an M/I molar ratio of 200, in the disk-shaped gaps of a rheometrix at the temperature of 100° C.

Figure 2:
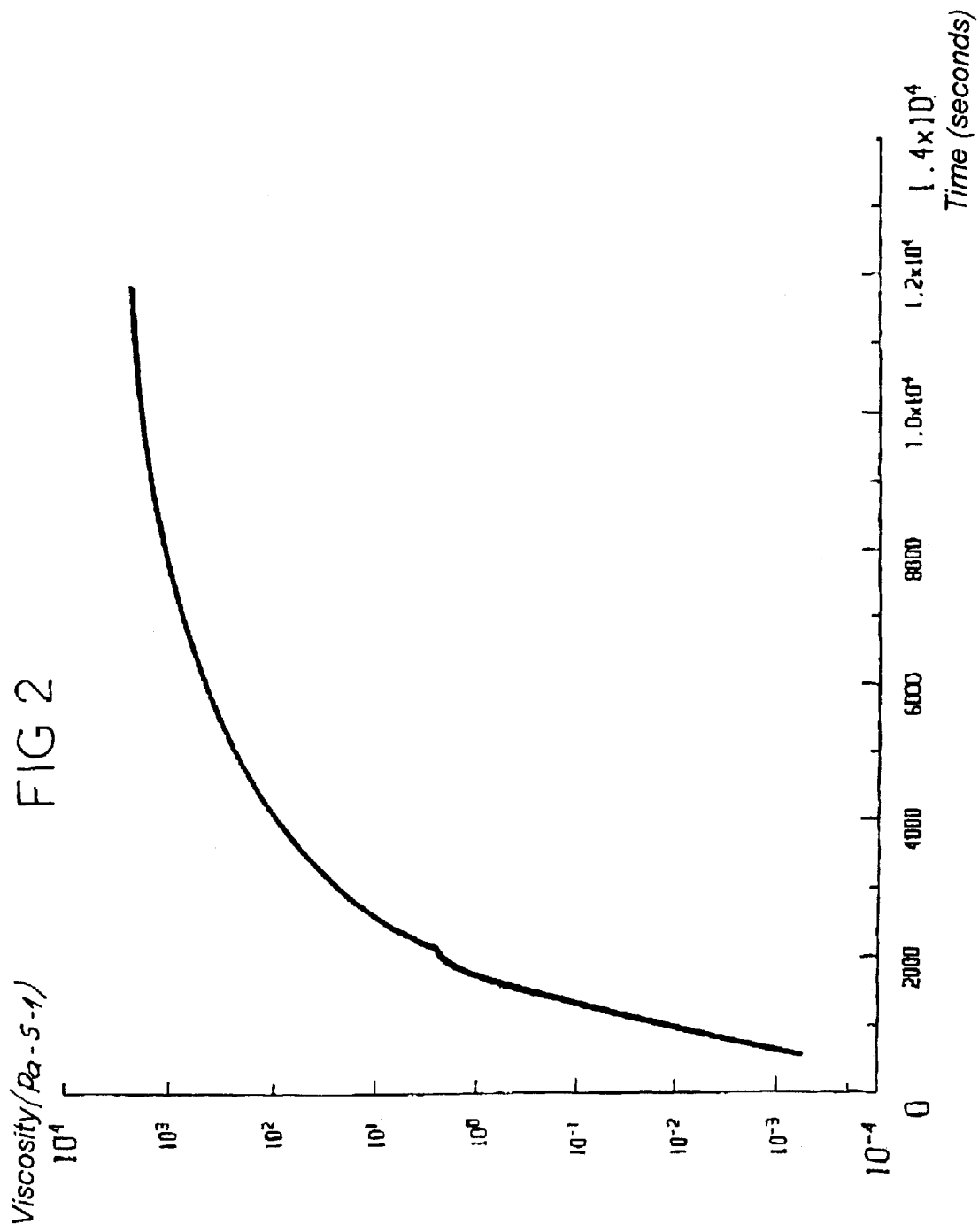
FIG. 2 represents the viscosity (in Pa.s of the reaction medium described in Example 1.6 as a function of time (in seconds)

The increase in viscosity is visualized on FIG. 2. The viscose plateau is reached after 4500 seconds of contact. The viscosity value is then 21,00 Pa.s$^{-1}$.

The $^1$H NMR analysis of the sample gives a polymolecularity index of 150. The mean molecular masses obtained by GPC (THF) are Mn=26000 and Mw=46000, Mn/Mw=1.79.

EXAMPLE 2

Preparation of the Homopolymer polyvalerolactone According to the Invention Using δ-valerolactone The polymer produced corresponds to the following formula:

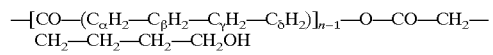

in which n represents the polymolecularity index.

The composition of the reaction mixture is as follows: 3.45 g (0.0345 mol) of δ-valerolactone and 0.48 g (0.00345 mol) of TBD in 15 ml of anhydrous THF.

The reaction is exothermic and the mixture becomes viscose after stirring for fifteen minutes.

The proton NMR analysis indicates a polymolecularity index of 30. The unresolved peaks characteristic of polyvalerolactones at δ in ppm are 1.68 CH$_2$ δ, β; 2.32 CH$_2$ α; 4.1 CH$_2$ δ(triplet) [lacuna]. The CH$_2$OH chain end appears at δ=3.62 ppm (triplet).

EXAMPLE 3

Preparation of Copolymers Using δ-valerolactone and ε-caprolactone

The reaction conditions are identical to those given in Example 1.1, with a mixture of 51.3 g of ε-caprolactone (0.45 mol) and 5 g of δ-valerolactone (0.05 mol). The M/I molar ratio is 20.

The NMR spectrum of the copolymer produced shows an absence of the starting monomers and is in accordance with the expected polymer.

The GPC indicates a single distribution Mn=31000 and Mw=10600; the Mn/Mw ratio=3.4.

EXAMPLE 4

Preparation of a Polylactide Homopolymer Using d,l-lactide (or 2,6-dimethyl-1,4-dioxan-2,5-dione)

20 ml of anhydrous toluene are introduced into a 50 ml three-necked flask. A mixture of 3.26 g (0.0227 mol) of lactide and 0.315 g (0.00227 mol) of TBD is added; the M/I molar ratio is 10. The temperature is brought to 110° C. for 4 hours. Washing of the organic phase with 2% acetic acid then with 2% hydrochloric acid and then with water, followed by evaporation of the solvent, produces the pure polylactide identified by $^1$H NMR: δ=1.55 ppm CH$_3$ (doublet); δ=5.17 CH broad peak; δ=4.36 ppm CH (quartet).

The degree of polymolecularity determined by NMR is 10. The polymer contains less than 3% of residual monomer. The mean molecular masses obtained by GPC (THF) are: Mn=2140 and Mw=4990, Mn/Mw=2.33.

EXAMPLE 5

Preparation of an ε-caprolactone Homopolymer in THF

The reaction is carried out in solution in THF at 60° C. 1.06 g of TBD are placed in 10 ml of solvent and then 33 g of ε-caprolactone dissolved in 30 ml of solvent are added dropwise. The reaction mixture is brought to the reflux temperature of THF for 180 minutes with stirring at 500 rpm, and is then poured into 100 ml of water. An emulsion forms. The reaction solvent is driven off and replaced with 100 ml of CH$_2$Cl$_2$. The organic phase is settled out and washed with 100 ml of water containing 2% HCl and then with pure water, and the solvent is eliminated. The polycaprolactone is identified free of monomer.

EXAMPLE 6

Preparation of an ε-caprolactone-d,l-lactide Random Copolymer

The random copolymer ε-caprolactone(C)-d,l-lactide(L) may be represented by CLCLCLCLCLCCLCLL-etc.

14.4 g (0.1 mol) of d,l-lactide, 11.4 g (0.1 mol) of ε-caprolactone and 1.39 g of solid TBD (0.01 mol) are introduced into a 100 ml three-necked reactor under nitrogen. The M/I molar ratio is equal to 20. The initiator completely dissolves with stirring and the reaction is exothermic. The temperature reaches 50° C. The mixture is stirred at 500 rpm for 30 minutes. The viscose mixture is then brought to 60° C. for one hour and then to 80° C. for three hours.

The NMR analysis indicates the resolved peaks $\alpha$, $\beta$, $\gamma$, $\delta$ and $\epsilon$ of the polymerized lactone accompanied by the unresolved peaks characteristic of the polymerized d,l-lactide. The mean mass composition of the copolymer is 50 units of ε-caprolactone for 38 units of d,l-lactide.

The presence of a random copolymer is proved by $^{13}C$ NMR, comparing the NMR spectra of the homopolymers and of the copolymer formed. The LC and CL sequences of the C=Os give $\delta$s in the range $\delta$=170–173 ppm, whereas the corresponding homopolymers are at $\delta$=173.3 ppm for the C=O of the polycaprolactone and $\delta$=169–169.8 ppm for the C=O of the d,l-polylactide. This distribution is confirmed by the localized chemical shifts of the $^{13}C$s of the CHs and CH$_2$s for the same homopolymers and copolymers.

EXAMPLE 7

Preparation of an ε-caprolactone-d,l-lactide Block Copolymer, in Solution in THF The block copolymer ε-caprolactone(C)-d,l-lactide(L) may be represented by CCCCC-LLLLL.

14.4 g (0.1 mol) of ε-caprolactone and 1.39 g (0.01 mol) of solid TBD are introduced into a 100 ml three-necked reactor under nitrogen. The reaction mixture is brought to 80° C. for two hours and 11.4 g (0.1 mol) of d,l-lactide are added. The initial M/I molar ratio is equal to 10. The polymerization is continued for three hours at 80° C. The viscose mixture is isolated and purified according to the conventional method.

The NMR analysis indicates the unresolved peaks $\alpha$, $\beta$, $\gamma$, $\delta$ and $\epsilon$ of the polymerized lactone accompanied by the peaks characteristic of the polymerized d,l-lactide at $\delta$=1.38 ppm (multiplet); 4.40 ppm (quartet) and 5.17 ppm (unresolved peak). The mean composition by mass of the copolymer is 42 units of ε-caprolactone for 28 (56 OCH(CH$_3$)CO fragments) of d,l-lactide.

The formation of a block copolymer is visualized by $^{13}C$ NMR. The comparison of the NMR spectra of the respective homopolymers of ε-caprolactone and of d,l-lactide, with that of the copolymer formed, shows that the LL and CC sequences of the C=Os are associated with $\delta$=173.3 ppm for the C=O of the polycaprolactone CC sequences and $\delta$=169–169.8 ppm for the C=O of the d,l-polylactide.

No trace of copolymer is detected in the range of $\delta$=170–173 ppm of the random copolymers.

This specific distribution is confirmed by the $^{13}C$ chemical shifts of the CHs and CH$_2$s for the same homopolymers and copolymers of ε-caprolactone (CCC etc.) and (LLL etc.). The presence of copolymer is based on the fact that the ε-caprolactone chain end (CH$_2$OH) is not detectable at $\delta$=3.62 ppm in the copolymer produced after sequential addition of the two monomers in the order ε-caprolactone, d,l-lactide, whereas the signal at $\delta$=4.4 ppm corresponding to the end-of-chain C$\underline{H}$—OH of the open lactide is observed.

EXAMPLE 8

Preparation of a Polyglycolide Homopolymer

The reaction is carried out in acetone, which is the solvent for the monomeric glycolide. The composition of the initial mixture is 11.6 g (0.1 mol) of glycolide per 0.458 g (0.0033 mol) of TBD. The M/I molar ratio is 30. The reaction is exothermic and a white precipitate forms immediately as soon as room temperature has been reached and the first fractions of TBD have been added. The mixture is brought to the reflux temperature of acetone for two hours. The white solid is isolated by filtration and the solvent is evaporated off under vacuum.

The NMR analysis (DMSO-D$^6$ while hot) indicates the formation of a polyglycolide with the appearance of a singlet at $\delta$=4.85 ppm. The CH$_2$OH chain end is identifiable at $\delta$=4.10 ppm and gives a degree of polymolecularity of 30. The $^{13}C$ NMR spectrum is characteristic of the formation of the polyglycolide, with regard to the chemical shift of the monomer, with a $\delta$=166 ppm for the C=O; $\delta$=60.4 ppm for the CH$_2$ and $\delta$=59.2 ppm for the CH$_2$OH, by $^{13}C$ NMR.

The known insolubility of the polymer is verified. Only DMSO while hot, hexafluoropropanol and hexafluoroacetone are solubilizers of the polymer.

EXAMPLE 9

Preparation of Polylactones and Functionalization in situ 9.1—Standard Experimental Protocol The lactone is mixed with the functionalizing agent and the mixture is homogenized at 80° C. After homogenization, the initiator is introduced all at once. The mixture is heated for 3 hours at 80° C. and then for one hour at 100° C. and finally for one and a half hours at 120° C. The crude reaction mixture is recovered and analyzed.

Examples 9.2 to 9.6 below illustrate the application of this protocol to the production of functionalized polylactones.

9.2—Preparation of an ε-polycaprolactone and functionalization with ethoxyethanol (simultaneous addition)

A functionalized ε-polycaprolactone is prepared in accordance with the procedure described in 9.1, with 25 g (0.22 mol) of ε-caprolactone, 2.03 g (0.0146 mol) of TBD and 1.98 g of ethoxyethanol. The M/I molar ratio is 15.

A crude sample is taken. The polymer is dissolved in 200 ml of CH$_2$Cl$_2$ and 100 ml of water containing 2% of HCl. The organic phase is left to settle out and then washed with 100 ml of water. The solvent is evaporated off, the remainder is take up with toluene, which is, in turn, evaporated off.

A washed sample is isolated.

The comparison of the NMR spectra of the crude product before and after washing and extraction indicates the presence of the ethoxyethoxy [sic] group in the chain of the ε-polycaprolactone: $\delta$=1.2 ppm triplet of the methyl group; $\delta$=4.2 ppm triplet of the OCH$_2$CH$_2$—O—CO group. The $^1H$ NMR spectrum more particularly contains the triplet at $\delta$=4.23 ppm, characteristic of the protons of CH$_2$ of the ester of the ethoxyethanol group attached.

The GPC analysis gives:

Final Mn=980, final Mw=3800; Mn/Mw=3.88.

It is observed that, when increasing the M/I molar ratio (simultaneous reaction of 25 g of caprolactone, 1 g of ethoxyethanol and 1 g of TBD; the reaction is exothermic, the temperature reaches 65° C. at the time of mixing), and for the same reaction time, a lower conversion rate, with more than 50% of residual caprolactone, is obtained. The masses of the crude polymer are Mn 3600 and Mw 7490; Mn/Mw=2.06.

9.3—Preparation of an ε-polycaprolactone and Functionalization with Polyoxyethylene Glycol 6000 (PEG 6000, Mean Hydroxyl Group Content $5.3 \times 10^{-3}$/g)

A polycaprolactone modified with PEG 6000 is prepared according to the procedure described in Example 9.1. The monomer/initiator and PEG 6000/initiator molar ratios are, respectively, 30 and 0.62. The initial mixture of 50.6 g (0.44 mol) of ε-caprolactone and 54.6 g of PEG 6000 ($9 \times 10^{-3}$ mol) is brought to 60° C. 2.02 g ($1.45 \times 10^{-2}$ mol) of TBD are then added in solid form, all at once. The reaction is exothermic and the temperature reaches 75° C. The mixture is maintained at 80° C. for 3 hours, then one hour at 100° C. and, finally, 1 h 30 at 120° C. The crude white product is isolated, which solidifies with cooling.

The NMR analysis reveals the structural elements of the polycaprolactone as indicated in Example 1.1 and a signal for the $CH_2CH_2$ protons of the polyoxyethylene at δ=3.64 ppm. The signal at δ=4.2 ppm, characteristic of the protons of the $CH_2$ of the ester derived from the coupling of the PEG 6000 and of the polycaprolactone, is identified.

The SEC analysis gives the molecular masses Mn=9500 and Mw=10800 and a polydispersity index Mn/Mw=1.14.

9.4—Preparation of an ε-polycaprolactone and functionalization with polyoxyethylene glycol 20000 (PEG 20000, hydroxyl group content $1.6 \times 10^{-3}$ molar).

The abovementioned standard procedure is carried out with 25.3 g (0.22 mol) of ε-caprolactone, 91 g of PEG 20000 ($4.55 \times 10^{-3}$ mol) and 1.01 g (0.0073 mol) of TBD. The monomer/initiator and PEG 20000/initiator molar ratios are, respectively, 30 and 0.62. The crude product is isolated, which solidifies with cooling.

The NMR analysis reveals the structural elements of the polycaprolactone as indicated in Example 1.1 and a PEG $CH_2CH_2$ signal at δ=3.64 ppm. A very weak signal at δ=4.2 ppm, characteristic of the protons of the $CH_2$ of the ester formed by coupling of the alcohol function of the PEG and of the polycaprolactone, is identified.

9.5—Preparation of an ε-polycaprolactone and Functionalization with a PEG 20000-xanthan gum mixture The standard procedure of Example 9-1 is carried out, with an initial mixture consisting of 35 g (0.31 mol) of ε-caprolactone, 91 g of PEG 20000 ($4.55 \text{ mol} \times 10^{-3}$ mol) and 2 g of xantham gum. The internal temperature of the mixture is brought to 60° C. and 1.39 g ($10^{-2}$ mol) of TBD are added. The monomer/initiator and PEG 20000/initiator molar ratios are, respectively, 30 and 0.45. The crude product is isolated, which solidifies with cooling.

Figure 3:
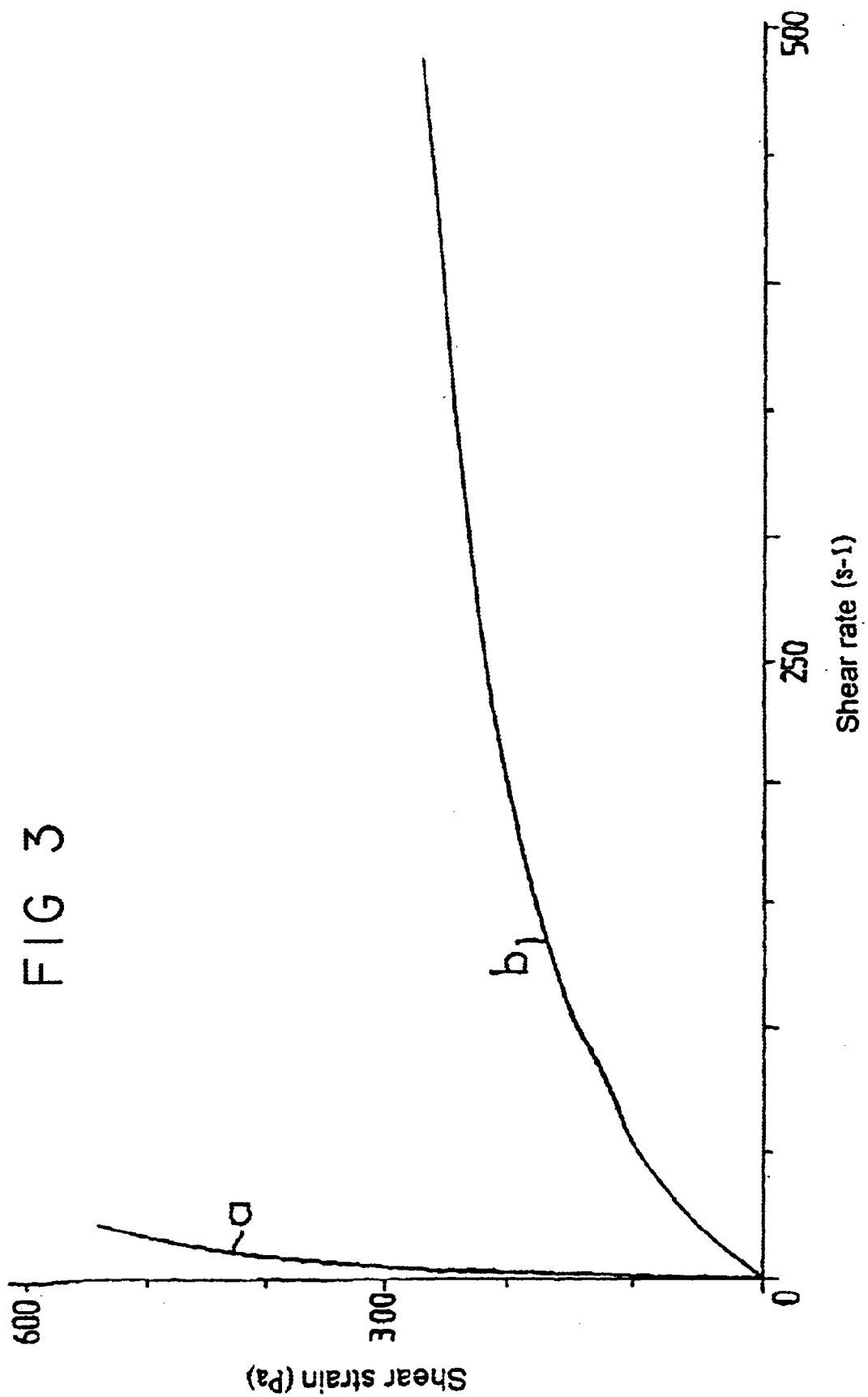
FIG. 3 illustrates the rheological behavior of a polycaprolactone after funtionalization according to Example 9.5, by representing the shear strain (in Pa) as a function of the shear rate (in second$^{-1}$)

The viscose behavior of the aqueous solution is demonstrated by rheological measurement on a Rheomat 30. The value of the shear strain, measured on a 6% aqueous solution, reaches 500 Pa at 10 $s^{-1}$ of shear rate. On FIG. 3, the curve of shear strain as a function of the shear rate demonstrates a rheofluidizing effect.

EXAMPLE 10

Preparation of Polylactones and Functionalization, According to a Sequenced Method 10.1—Standard Experimental Protocol The lactone is heated to 80° C. After homogenization of the lactone, the initiator is added. For the polymerization, the mixture is heated for 3 hours at 80° C. Next, the functionalizing agent is added, and then the mixture is brought to 100° C. for one hour and to 120° C. for one and a half hours. The crude reaction mixture is recovered and analyzed.

Examples 10.2 to 10.7 below illustrate the application of this protocol to the production of functionalized polylactones.

10.2—Preparation of an ε-polycaprolactone and Functionalization with Butanol (Sequenced Addition)

A polylactone is prepared in accordance with the procedure described in 1.1, with 11.4 g (0.1 mol) of ε-polycaprolactone and 2.78 g (0.02 mol) of TBD. The M/I molar ratio is 20.

The reactor, equipped with a cooler, is maintained at 80° C. for 3 hours. The viscose polymer is treated with 3.6 g of butanol (0.05 mol). The reaction time is prolonged by bringing the heating oil bath to 100° C. for one hour and then to 120° C. for one and a half hours.

The NMR spectrum of the crude product after washing and extraction with methylene chloride indicates the presence of the butoxy segment in the chain of the ε-polycaprolactone (δ=0.92 ppm triplet of the methyl group). The NMR of the carbonyl (C=O) indicates two types of C=O: the C=O of the polycaprolactone at δ=173.3 ppm and the C=O of the n-butoxy ester at δ=173.1 ppm.

The degree of functionalization evaluated by NMR is 46%.

The SEC analysis gives the following results:

Before addition of the butanol, initial Mn=4400, initial Mw=10200; Mn/Mw=2.32,

After addition of the butanol, final Mn=1350, final Mw=3650; Mn/Mw=2.69.

10.3—Preparation of an ε-polycaprolactone and Functionalization with Ethoxyethanol (Sequenced Addition)

A polycaprolactone is prepared in accordance with the procedure described in 1.1, with 25 g (0.22 mol) of ε-caprolactone and 2.03 g (0.0146 mol) of TBD. The M/I molar ratio is 15.

The reaction is exothermic and the temperature reaches 65° C. The medium becomes viscose. The reactor is brought to 80° C. for 3 hours. The viscose polymer is treated with 1.98 g of ethoxyethanol (0.022 mol). The reaction time is prolonged by bringing the heating oil bath to 100° C. for one hour and then to 120° C. for one and a half hours. The crude sample is removed. The polymer is dissolved in 200 ml of $CH_2Cl_2$ and 100 ml of water containing 2% of HCl. The organic phase is left to settle out and then washed with 100 ml of water. The solvent is evaporated off and the remainder is taken up with toluene, which is, in turn, evaporated off.

The comparison of the NMR spectra of the crude product before and after washing and extraction indicates the presence of the ethoxyethoxy [sic] group in the chain of the ε-polycaprolactone: δ=1.2 ppm triplet of the methyl group; δ=4.2 ppm triplet of the $OCH_2CH_2$—O—CO group. The $^1H$ NMR spectrum more particularly contains the triplet at δ=4.23 ppm, characteristic of the protons of $CH_2$ of the ester of the ethoxyethanol group attached.

The degree of functionalization is evaluated at 70%.

The $^{13}C$ NMR analysis of the COs shows the presence of the COs of the polycaprolactone at δ=173.27 ppm and the ester CO linked to the butoxy segment at δ=173.12 ppm.

The SEC analysis gives the following results:

Before addition of the ethoxyethanol: initial Mn=3600, initial Mw=12900; Mn/Mw=3.53;

After addition of the ethoxyethanol: final Mn=1160, final Mw=3790; Mn/Mw=3.25.

10.4—Preparation of an ε-polycaprolactone and Functionalization with Allylamine (Sequenced Addition)

A polycaprolactone is prepared in accordance with the procedure described in 1.1, with 25 g (0.22 mol) of ε-caprolactone and 3.04 g (0.022 mol) of TBD. The M/I molar ratio is 10.

The reaction is exothermic and the temperature reaches 65° C.

The medium becomes viscose. The reactor is brought to 80° C. for 3 hours. The viscose polymer is treated with 1.25 g of allylamine (0.022 mol). The reaction time is prolonged by bringing the heating oil bath to 100° C. for one hour and then to 120° C. for one and a half hours. The crude sample is removed. The polymer is dissolved in 200 ml of $CH_2Cl_2$ and 100 ml of water/2% of HCl. The organic phase is left to settle out and then washed with 100 ml of water. The solvent is evaporated off and the remainder is taken up with toluene, which is, in turn, evaporated off.

The $^1H$ NMR analysis indicates the characteristic presence of the protons of the allyl group in the form of an unresolved peak consisting of an unresolved peak at δ=5.1 ppm for the $CH_2$ α of the double bond and a complex unresolved peak at δ=5.6–5.9 ppm for the protons on the double bond. The $^{13}C$ NMR analysis gives $\delta_{C=O}$=173.510 ppm for the C=O group of the polycaprolactone and $\delta_{C=O}$=172.583 ppm for the C=O of the coupling group O=C—NH.

The NMR integration ratio of the end-of-chain $CH_2$ to the rest of the polycaprolactone indicates a degree of polymolecularity of 6.

The SEC indicates a polymer free of monomer and of allylamine.

10.5—Preparation of an ε-polycaprolactone and Functionalization with Methoxyethylamine (Sequenced Addition)

A polycaprolactone is prepared in accordance with the procedure described in 1.1, with 25 g (0.22 mol) of ε-caprolactone and 3.04 g (0.022 mol) of TBD. The M/I molar ratio is 1/10.

The reaction is exothermic. The medium becomes viscose.

The reactor is brought to 80° C. for 3 hours. The viscose polymer is treated with 1.65 g of methoxyethylamine (0.022 mol). The reaction time is prolonged by bringing the heating oil bath to 100° C. for one hour and then to 120° C. for one and a half hours. The crude sample is removed. The polymer is dissolved in 200 ml of $CH_2Cl_2$ and 100 ml of water. The organic phase is left to settle out and then washed with 100 ml of water. The solvent is evaporated off and the remainder is taken up with toluene, which is, in turn, evaporated off.

The $^1H$ NMR analysis indicates the characteristic presence of the protons of the methoxy group in the form of a singlet at δ=3.36 ppm ($CH_3O$ ). The carbonyl of the amide group (CO—NH) appears at δ=173.735 ppm close to the carbonyl of the polycaprolactone at δ=173.5 ppm.

The NMR integration ratio of the end-of-chain $CH_2$ to the polycaprolactone residue indicates a degree of polymolecularity of 6.

The SEC indicates a polymer free of monomer.

10.6—Preparation of an ε-polycaprolactone and Functionalization with Decylamine (Sequenced Addition)

A polycaprolactone is prepared with 25 g (0.22 mol) of ε-caprolactone and 0.1 g (0.0073 mol) of TBD. The M/I molar ratio is 30.

The reaction is exothermic. The medium becomes viscose. The reactor is brought to 80° C. for 3 hours. The viscose polymer is treated with 3.45 g of decylamine (0.0022 mol). The reaction time is prolonged by bringing the heating oil bath to 100° C. for one hour and then to 120° C. for one and a half hours. The crude sample is removed. The polymer is dissolved in 200 ml of $CH_2Cl_2$ and 100 ml of water. The organic phase is left to settle out and then washed with 100 ml of water. The solvent is evaporated off and the remainder is taken up with toluene, which is, in turn, evaporated off.

The $^1H$ NMR analysis indicates the characteristic presence of the protons of the $CH_3$ group, δ=0.9 ppm in the form of a triplet. The presence of the $CH_2$ groups of the amine modifies the unresolved peak of the $CH_2$s at δ=1.7 ppm. The amide carbonyl group is identified by $^{13}C$ NMR at δ=172.47 ppm, close to the C=O group of the polycaprolactone at $\delta_{C=O}$=173.18 ppm.

The integration ratio of the end of chain to the polycaprolactone residue indicates a degree of polymerization (determined by SEC) of 33 before functionalization, and of 22 after treatment with decylamine. The level of attachment assessed by NMR is 70%.

The SEC indicates a polymer free of monomer.

The SEC (THF) analysis gives the following results:

After addition of the decylamine: final Mn=3700 and final Mw=8600; Mn/Mw=2.32.

10.7—Preparation of an ε-polycaprolactone and Functionalization with Tetraethylene Glycol 200 (TEG, M=194, Mean Hydroxyl Group Content 0.16 eq./g) (Sequenced Addition)

A polycaprolactone modified with TEG-200 is prepared according to the sequential method described in 10.1.

The monomer/initiator molar ratio is 30; that of TEG 200/initiator is 0.89. 35 g (0.31 mol) of ε-caprolactone are brought to 60° C. and 1.39 g (0.01 mol) of TBD in solid form is added all at once. The reaction is exothermic and the temperature reaches 75° C. The temperature is maintained at 80° C. for three hours. The ε-caprolactone polymerizes and the medium becomes pasty. 1.71 g ($0.89 \times 10^{-2}$ mol) of TEG are added. The mixture is brought to 100° C. for one hour and then to 120° C. for 1 h 30. A slightly pink crude product is isolated, which solidifies with cooling.

The NMR analysis reveals the structural elements of the polycaprolactone as indicated in Example 1.1 and a signal for the $CH_2CH_2$ protons of the tetraoxyethylene at δ=3.64 ppm (multiplet). The signal, at δ=4.2 ppm (triplet), characteristic of the protons of the $CH_2$ of the ester derived from coupling TEG-200 and polycaprolactone, is identified. The complete elimination of the initiator by washing is noted.

The SEC analysis gives a single distribution of molecular masses Mn=10900 and Mw=29000, i.e. a polydispersity index Mn/Mw=2.6, for the polylactone before functionalization, and Mn=4400 and Mw=9300 and a polydispersity index Mn/Mw=2.1, for the polycaprolactone functionalized with TEG-200.

In a second test, an equivalent amount of the crude polymer is dissolved in 100 ml of $CH_2Cl_2$ and washed with 100 ml of 3N HCl followed with 100 ml of water. The emulsified mixture is left to settle out and the organic phase is recovered, which organic phase is dried and then evaporated, under vacuum for two hours under $10^{-1}$ mm Hg. The white polymer solidifies. The NMR analysis indicates an absence of the initiator.

EXAMPLE 11

Preparation of Polylactides and Functionalization, in situ 11.1—Standard Experiment Protocol The lactide is mixed with the functionalizing agent and the mixture is homogenized at 80° C. After homogenization, the initiator is introduced all at once. The mixture is heated for 3 hours at 80° C., then for one hour at 100° C. and finally for one and a half hours at 120° C. The crude reaction mixture is recovered and analyzed.

Examples 11.2 to 11.4 below illustrate the application of this protocol to the production of a functionalized polylactide.

11.2—Polymerization of a (D,L)-lactide and Functionalization with a PEG 10000

The standard procedure of Example 11-1 is carried out, with an initial mixture of 5.8 g (0.05 mol) of (D,L)-lactide and 8 g of PEG 10000 ($0.8 \times 10^{-3}$ mol). The internal temperature of the mixture is brought to 60° C. and 280 mg ($2.01 \times 10^{-3}$ mol) of TBD are added. The monomer/initiator and PEG 10000/initiator molar ratios are, respectively, 25 and 0.40. A brittle white solid is isolated.

The NMR spectrum (CHCl$_3$) shows the characteristic elements at $\delta=1.57$ ppm (CH$_3$, unresolved peak); $\delta=5.17$ ppm (O—CHCH$_3$, multiplet), $\delta=4.32$ ppm (CH$_2$CH$_2$—OCO, multiplet), $\delta=4.36$ ppm (HO—CH—CH$_3$, quartet), $\delta=10.3$ ppm (COOH). The NMR analysis indicates the presence of a lactide-PEG coupling ester group and polylactide/OH chain end/COOH chain end abundance residues of 0.035/0.038/0.032.

The SEC measurement of the molecular masses gives Mn=15300, Mw=17300 and Mn/Mw=1.13.

The product dissolved in CH$_2$Cl$_2$ and then washed with water acidified with HCl (pH=3) gives (D,L)-polylactide-PEG free of TBD.

11.3—Polymerization of an (L)lactide and Functionalization with a PEG 10000

The procedure of Example 11-1 is carried out, with an initial mixture of 2.9 g (0.025 mol) of (L)lactide and 6 g of PEG 10000 ($0.6 \times 10^{-3}$ mol). The internal temperature of the mixture is brought to 60° C. and 139 mg ($10^{-3}$ mol) of TBD are added. The monomer/initiator and PEG 10000/initiator molar ratios are, respectively, 25 and 0.60. A brittle white solid is isolated.

The NMR spectrum gives the characteristic elements at $\delta=1.57–9$ ppm (CH$_3$, doublet); $\delta=5.15–7$ ppm (O—CHCH$_3$, doublet), $\delta=4.32$ ppm (CH$_2$CH$_2$—OCO, multiplet), $\delta=4.36$ ppm (HO—CH—CH$_3$, quartet), $\delta=10.3$ ppm (COOH). The NMR analysis clearly indicates the presence of a lactide-PEG coupling ester group and (L)-polylactide-PEG ester/OH chain end/COOH chain end abundance ratios of 0.068/0.049/0.043.

The SEC measurement of the molecular masses gives Mn=14400, Mw=16600 and Mn/Mw=1.15.

The crude product dissolved in CH$_2$Cl$_2$ and then washed with water acidified with HCl (pH=3) gives (L)-polylactide-PEG free of TBD.

11.4—Polymerization of (D,L)-lactide-glycolide and Functionalization with a PEG 10000.

A procedure modified from Example 11-1 is carried out. The initial mixture contains 3.5 g ($2.2 \times 10^{-2}$ mol) of (D,L)-lactide and 4 g of PEG 10000 ($0.4 \times 10^{-3}$ mol). The mixture is brought to 60° C. and 0.28 g ($2 \times 10^{-3}$ mol) of initiator TBD is added. The polymerization-grafting reaction is carried out to its end according to the protocol of Example 1.1. The temperature is brought back to 50° C. at the end of the reaction and 2.2 g ($1.9 \times 10^{-2}$ mol) of glycolide are added, which react instantaneously. The mixture is maintained for 30 min at 80° C. and the hard and brittle slightly yellow solid is isolated.

The NMR analysis shows the elements characteristic of the poly(D,L)-lactide ($\delta=5.18$ ppm) and of the PEG at $\delta=3.63$ ppm, the CH$_2$ characteristic of an ester coupling group at $\delta=4.2–4.3$ ppm (in the form of a multiplet), the singlet signal of the polyglycolide at $\delta=4.8$ ppm (CH$_2$OCO) and of its end-of-chain CH$_2$ at 4.28 ppm (CH$_2$OH). The block polymer is relatively insoluble in organic solvents; it solubilizes in chloroform and DMSO while hot.

EXAMPLE 12

Preparation of Polylactides and Functionalization, According to a Sequenced Method 12.1—Standard Experimental Protocol The lactide is heated to 80° C. After homogenization of the lactone, the initiator is added. For the polymerization, the mixture is heated at 80° C. for 3 hours. Next, the functionalizing agent is added and the mixture is then brought to 100° C. for one hour and to 120° C. for one and a half hours. The crude reaction mixture is recovered and analyzed.

Example 12.2 below illustrates the application of this protocol to the production of functionalized polylactides.

12.2—Preparation of a Polylactide and Functionalization with Ethoxyethanol (Sequenced Addition)

The same procedure as that described in Example 12.1 is carried out, with 2.88 g (0.02 mol) of lactide, 185 mg of TBD and 1.8 g of ethoxyethanol (0.02 mol). The M/I molar ratio is 15. Addition of the initiator all at once causes solubilization and an increase in temperature up to 38° C. After the reaction has been allowed to proceed for two hours at 90° C., the solution becomes slightly red-brown. The crude sample is analyzed and the sample is washed as above.

The $^{13}$C NMR spectrum comprises a C=O at $\delta=172.416$ ppm (C=O of the polycaprolactone), a C=O at $\delta=172.622$ ppm (C=O coupled to the initiator) and a weak C=O at $\delta=172.224$ ppm (assigned to the C=O of the ethoxyethanol ester).

What is claimed is:

1. A process for producing oxacarbonylated polymers, reacting at least a monomer comprising at least one cyclic oxacarbonyl function, and an initiator and polymerizing or copolymerization said monomer in bulk or in solution to produce oxacarbonylated polymers, wherein the initiator is chosen from the bicyclic guanidine compounds corresponding to formula (I) or (II)

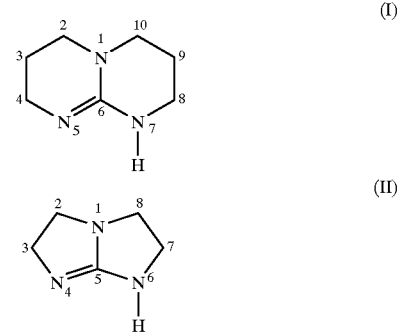

and from the bicyclic guanidine compounds corresponding to formula (I) in which at least any one of positions 2, 3, 4, 8, 9 and 10 is substituted and from the bicyclic biguanidine compounds corresponding to formula (II) in which at least any one of positions 2, 3, 7 and 8 is substituted, said position at least being substituted with at least one radical chosen from alkyl groups having from 1 to 6 carbon atoms, cycloalkyl groups having from 5 to 7 carbon atoms and the hydrocarbon-based chains of polystyrene.

2. The process as claimed in claim 1, wherein the initiator is 7H-1,5,7-triazabicyclo(4.4.0)dec-5-ene.

3. The process as claimed in claim 1, wherein the cyclic oxacarbonyl function of the monomer is a lactone function.

4. The process as claimed in claim 3, wherein the monomer is selected from the group consisting of ε-caprolactone, δ-valerolactone, β-butyrolactone, γ-butyrolactone, 2,6-dimethyl-1,4-dioxan-2,5-dione and 1,4-dioxan-2,5-dione.

5. The process as claimed in claim 1, wherein at least two different monomers are reacted.

6. The process as claimed in claim 1, wherein the molar ratio of the monomer(s) to the initiator ranges from 1 to 500.

7. The process as claimed in claim 1, wherein the reaction is performed at a temperature ranging from 0° C. to 150° C.

8. The process as claimed in claim 7, wherein the reaction is performed at a temperature ranging from 50° C. to 120° C.

9. The process as claimed in claim 7, wherein the polymerization reaction is carried out in bulk or in a solvent selected from the group consisting of tetrahydrofuran, toluene, and dibutyl ether.

10. The process as claimed in claim 1, wherein a functionalizing agent is added to the monomer and to the initiator.

11. The process as claimed in claim 10, wherein the functionalizing agent is a linear or branched molecule or macromolecule containing at least one alcohol function, one amine function or one ester function.

12. The process as claimed in claim 11, wherein the functionalizing agent is selected from the group consisting of butanol, ethoxyethanol, pentaerythritol, allylamine, methoxyethylamine, decylamine, ethoxyethanolamine and esters of carboxylic acids.

13. The process as claimed in claim 11, wherein the functionalizing agent is a polymer or copolymer of alkylene glycol.

14. The process as claimed in claim 13, wherein the functionalizing agent is a copolymer of ethylene (PEG), propylene (PPG) or mixtures thereof.

15. The process as claimed in claim 10, wherein the functionalizing agent is a mixture of at least one alkylene glycol polymer and at least one polyglucoside.

16. The process as claimed in claim 10, wherein the polymerization and the functionalization are carried out sequentially.

17. The process as claimed in claim 10, wherein the polymerization and the functionalization are carried out simultaneously in bulk or in a solvent.

18. An oxacarbonylated polymer that is produced using a process as claimed in claim 1.

19. An oxacarbonylated polymer that is produced using a process as claimed in claim 10.

20. A method for initiating the polymerization or copolymerization of a monomer having at least one oxacarbonyl function comprising:

reactingf a bicyclic guanidine compound corresponding to formula (I) or (II)

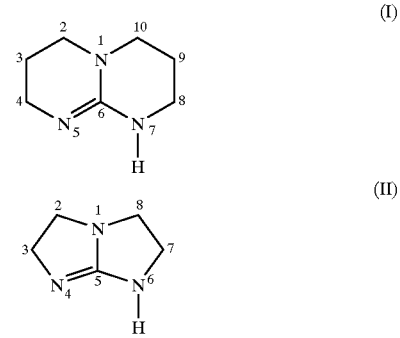

in which one and/or the other of the rings may be substituted, in at least any one of positions 2, 3, 4, 8, 9 and 10 of formula (I) or in at least any one of positions 2, 3, 7 and 8 of formula (II), with at least one radical chosen from alkyl groups having from 1 to 6 carbon atoms, cycloalkyl groups having from 5 to 7 carbon atoms and the hydrocarbon-based chains of polystyrene, with monomers comprising at least one cyclic oxacarbonyl function to initiate polymerization or copolymerization of the monomer.

21. The method as claimed in claim 20, wherein the bicyclic guanidine compound is 7H-1,5,7-triazbicyclo(4,4,0)dec-5-ene.

22. The process as claimed in claim 1, wherein the molar ratio of the monomers to the initiator ranges from 1 to 200.

23. The process as claimed in claim 11, wherein the functionalizing agent is chosen from polymers and copolymers of ethylene glycol (PEG), mixtures of said polymers, mixtures of said copolymers and mixtures of said polymers and copolymers.

* * * * *